(No Model.)

C. BEAN & G. W. WATSON.
STRAINER FOR TEA OR COFFEE POTS.

No. 435,007. Patented Aug. 26, 1890.

Witnesses
L. S. Burbank
H. Durfee

Inventors,
Charles Bean,
George W. Watson,
Per
C. A. Shawaleer,
Attorneys

UNITED STATES PATENT OFFICE.

CHARLES BEAN AND GEORGE W. WATSON, OF PAWTUCKET, RHODE ISLAND.

STRAINER FOR TEA OR COFFEE POTS.

SPECIFICATION forming part of Letters Patent No. 435,007, dated August 26, 1890.

Application filed June 11, 1890. Serial No. 355,030. (No model.)

*To all whom it may concern:*

Be it known that we, CHARLES BEAN and GEORGE W. WATSON, both of Pawtucket, in the county of Providence, State of Rhode Island, have invented certain new and useful Improvements in Strainers for Tea or Coffee Pots, of which the following is a description sufficiently full, clear, and exact to enable any person skilled in the art or science to which said invention appertains to make and use the same, reference being had to the accompanying drawings, forming part of this specification, in which—

Figure 1:
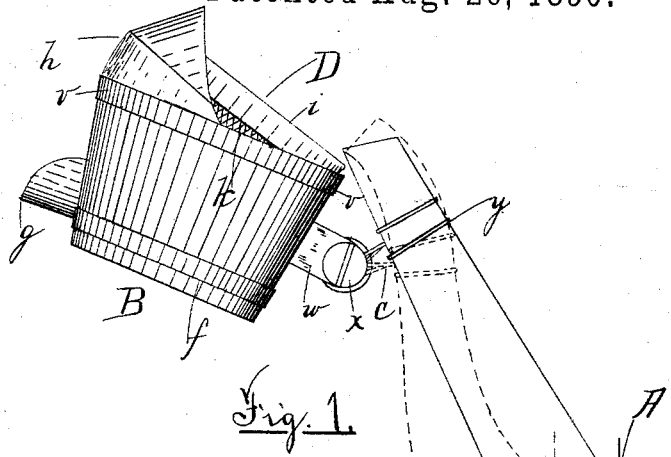
Figure 2:
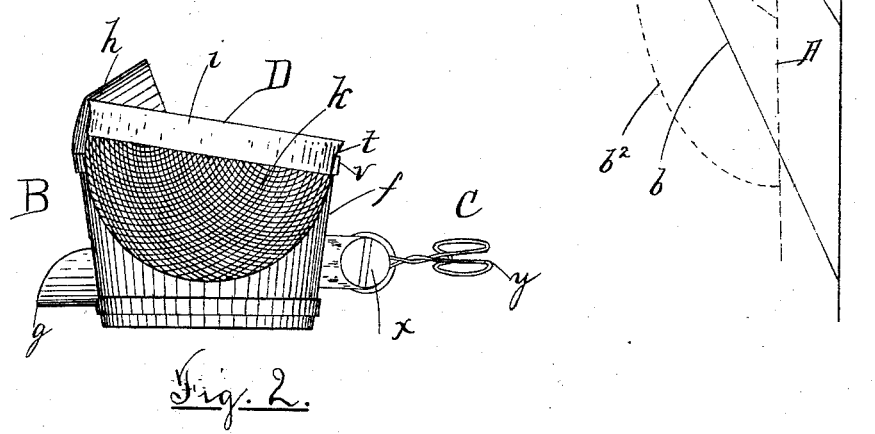

Figure 1 is an elevation showing our improved strainer in position for use; Fig. 2, a sectional elevation of the strainer detached; and Fig. 3 a plan view showing the attaching-spring.

Like letters of reference indicate corresponding parts in the different figures of the drawings.

Our invention relates especially to tea and coffee strainers which are adapted to be detachably secured to the nose of the pot; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the tea or coffee pot; $b$ $b^2$, respectively, a straight and curved nose thereon.

B represents the strainer considered as a whole, which comprises a pail or bucket shaped body $f$, from one side or near the bottom of which a spout $g$ projects.

At the upper edge of the body A a vertically and inwardly inclined hood $h$ is secured, said hood being disposed above the discharge-spout $g$.

The strainer proper D consists of a sheet of wire-cloth or similar reticulated fabric $k$, hemispherical in elevation and provided with a metallic band or rim $i$ at its edge. The strainer proper is of such size that it may be inserted into the mouth of the strainer-body $f$ and be supported thereby, as shown in Fig. 2, its rim $i$ being grooved or bent inward at $t$ slightly to receive the rim $v$ of said body $f$. Projecting rearwardly from the body $f$ at the side opposite the spout $g$ there is a lug $w$, in the outer end of which a screw-clamp $x$ is disposed.

Figure 3:
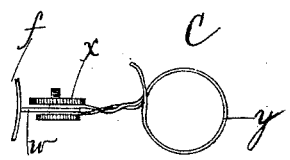

The attaching-spring C consists of a piece of wire folded upon itself and then bent or curved to form a circular loop $y$, the ends of said wire being secured in the clamp $x$, as best seen in Fig. 3. The loop $y$ is of a size suitable to inclose or encircle the nose $b$ $b^2$ of the coffee or tea pot, and said loop, being constructed of spring-wire, readily supports the strainer B thereon.

In the use of our improvement the strainer proper D is inserted in the mouth of the pail-shaped body $f$ and the device adjusted on the nose $b$ by means of the attaching-spring C. By adjusting said spring in the clamp $x$ the strainer may be arranged at any angle desired to receive the flow from the pot-nose. The pot being inclined in the ordinary manner the tea or coffee passes from the nose into the strainer proper D, which retains all sediment, thence into the body $f$ and out through the spout into the cup. As soon as the pot is returned the strainer resumes the position shown in Fig. 1, in which it is inclined toward the body, and the drip from the spout $g$ flows backward into the strainer-body $f$, in which it is retained and prevented from flowing outside the strainer. The drainings from the sediment in the strainer proper D are also caught and retained by the body $f$. This obviates the necessity of removing the strainer from the nose of the pot as soon as used, as is customary with strainers of ordinary construction.

Having thus explained our invention, what we claim is—

1. A strainer for tea or coffee pots, comprising a pail-shaped body having a spout near its bottom, a detachable strainer proper adapted to be inserted in the mouth of said body, and mechanism for securing said body to the pot-nose, substantially as described.

2. A strainer for tea or coffee pots, comprising a pail-shaped body provided with a spout near its bottom and a hood or guard at its rim, a detachable strainer proper adapted to be inserted in the mouth of said body, and mechanism for securing said body to the pot-nose, substantially as described.

3. A strainer for tea or coffee pots, comprising a pail-shaped body having a spout near its bottom and a lug at its opposite side, a detachable strainer proper adapted to be inserted in said body, and an attaching-spring adjustably secured in said lug, substantially as described.

4. The body provided with the spout and hood, in combination with the strainer proper, and the wire loop C, adjustably clamped to said body, substantially as described.

5. The body provided with the spout and clamp, in combination with the strainer proper and the wire spring-loop C, substantially as described.

6. The combination of the body provided with the spout with the strainer proper, and an attaching-spring adjustably secured to said body, said spring comprising a wire bent or folded upon itself to form a loop for the pot-nose, substantially as described.

7. The strainer B, comprising the body $f$, provided with the spout $g$ and clamp $x$, the strainer proper D, and attaching-spring C, arranged substantially as described.

8. The body $f$, provided with the spout $g$, clamp $x$, and hood $h$, in combination with the strainer D and attaching-spring C, arranged to operate substantially as described.

CHARLES BEAN.
GEORGE W. WATSON.

Witnesses:
HENRY FLETCHER,
WM. McLEURKE.